UNITED STATES PATENT OFFICE.

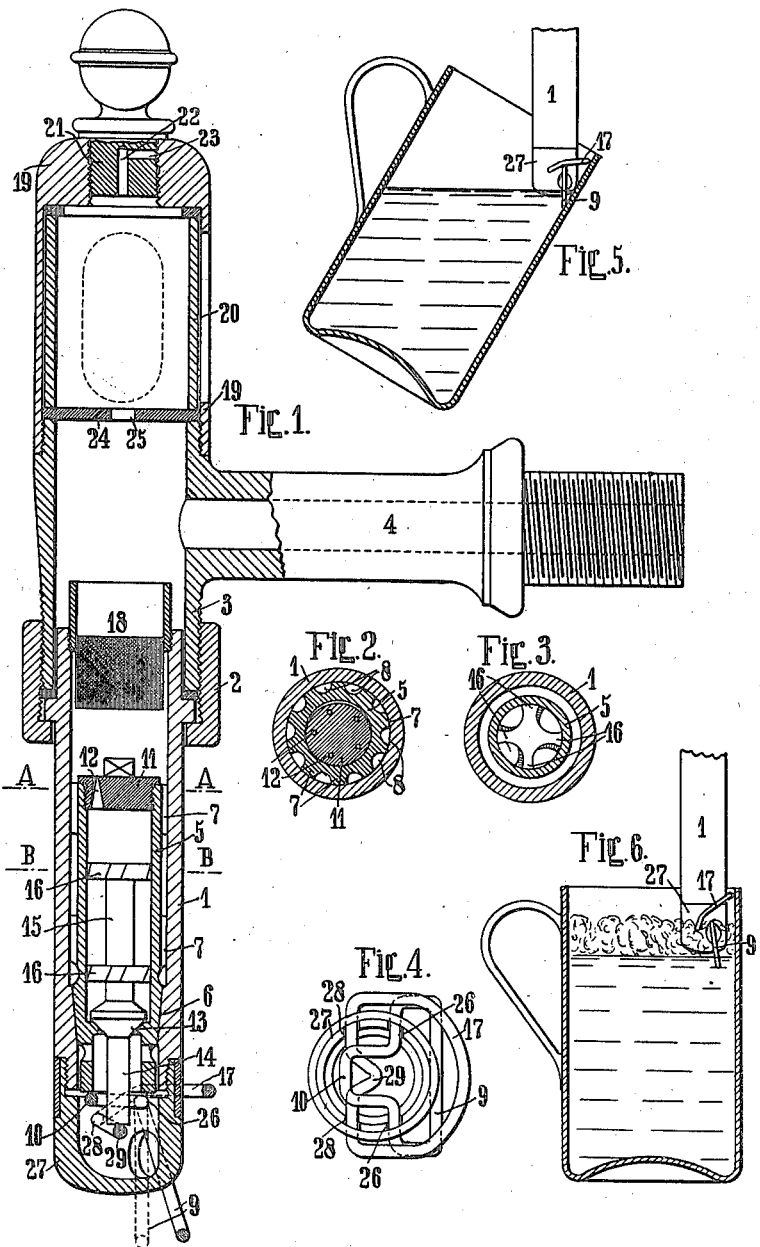

LOUIS HESS, OF DARMSTADT, GERMANY.

BAR-TAP FOR BEER OR SIMILAR DRINKS.

1,180,848.  Specification of Letters Patent.  Patented Apr. 25, 1916.

Application filed June 27, 1914. Serial No. 847,722.

*To all whom it may concern:*

Be it known that I, LOUIS HESS, a subject of the Emperor of Germany, and residing at Darmstadt, Germany, have invented certain new and useful Improvements in Bar-Taps for Beer or Similar Drinks, of which the following is a specification.

The object of my invention is to provide an improved bar tap for allowing beer or similar drinks to flow into the glass in two stages, namely, firstly without froth, and then with froth.

According to my invention, a valve, which is contained in a valve casing, and which closes the beer outlet when on its seating, acts as a throttling member, which, when the valve is raised from the seat, gradually reduces the pressure and in this manner assures an outflow of beer without froth. The advantage is thereby obtained, that a special closing means for the beer flowing through the throttling member can be dispensed with, and the serving out of the beer or the like is considerably simplified. The feature of the invention just set forth in its general outlines can be further developed by making the valve hollow and forming same to receive a second valve, which forms the closure for the beer converted into froth.

The arrangement characterized further permits of opening the tap for the outlet of beer without froth, as well as that for the outlet of the beer converted into froth, each by means of a lever which is actuated by the glass to be filled with beer. By this means not only is the serving out of the beer considerably facilitated, and especially made independent of the skill of the person serving the beer out, but it is also rendered possible to allow of two or even more serving devices being operated simultaneously by one person and accordingly filling several glasses at once.

A further advantage of the subject of the invention is contained in the fact that the closures for the frothless outlet of the beer, as well as for the beer converted into froth, are positioned beyond the means themselves which render possible the frothless outflow of the beer and the converting of the beer into froth. Consequently, so long as the valves are held closed by the excess pressure in the beer pipe, the beer present in the valve casing is kept constantly under pressure of carbonic acid gas, so that it retains its good taste.

A form of construction is illustrated by way of example in the drawing, in which:—

Figure 1 shows a vertical section through the bar tap, Figs. 2–3 each show a section on line A—A and B—B respectively. Fig. 4 is a plan view of the removed mouth-piece, Fig. 5 shows the tap to a smaller scale, at the time when the outlet of the frothless beer is opened by the side of the glass, and Fig. 6 shows the tap at the moment when the outlet of the frothless beer is closed, while the outlet of the beer converted into froth is opened by the side of the glass.

As can be seen from the drawing, 1 is the valve-casing containing the valve, said valve-casing being connected to the standard 3 attached to the beer pipe 4 by means of the union nut 2. The valve 5 situated in the valve-casing closes the passage for the frothless beer in its lower position by means of its seating surface 6. To this valve are attached guide bars 7 in order to guide the valve in the axial direction, the narrow channels 8 between such bars serving for the passage of the beer and causing the pressure of the through-flowing beer to be gradually reduced. The raising of the valve 5, which results in the opening of the frothless beer outlet, is effected by the glass itself through a lever or bow-shaped member 9. This lever is turned by the side of the glass into the dotted position (Fig. 1) when the beer is being served out, and thus lifts the valve 5 from its seat by means of its arm 10. The lever 9 is swingably mounted at 26 in the wall of the mouth-piece 27. The hollow chamber of the valve 5 is closed at the top by a closing head 11, in which one or several conical nozzles 12 are arranged, the enlarged parts of which are at the bottom. The beer flows through the conical nozzles at a high speed and consequently with a small pressure whereby the carbonic acid is liberated causing the beer to froth. The outlet for the beer converted into froth is closed by a valve 13, whose spindle 14 protrudes downwardly out of the hollow chamber of the valve 5 to some extent. The valve 13 possesses at the top the spindle 15, which is provided with guiding vanes 16.

In order to open the outlet for the beer converted into froth, the valve 13 must be lifted from its seat. This is effected by means of the lever 17, which is also swingably mounted at 28 in the walls of the mouth-piece 27, and which lifts by its portion 29 the spindle 14 and consequently also the valve 13 when it is raised by the glass being pressed against it.

The closing of the valve 5 takes place automatically by the carbonic acid gas pressure of the beer after the frothless beer has flowed into the glass, and after the glass has been brought from the position shown in Fig. 5 to that shown in Fig. 6, and the closing of the valve 13 also takes place automatically by the carbonic acid gas-pressure when the glass has been removed from the mouth-piece. In this manner, any loss of beer is avoided even when the serving of the beer is handled unskillfully, since as soon as the outlet for the beer which has been converted into froth is opened, the lever 9 is set free by the glass, as can be seen from Fig. 6, so that the outlet for the frothless beer is then closed by the pressure existing in the valve-casing, and only beer converted into froth for forming the head can flow into the glass through the valve 13.

The valve-casing is provided at the top with a strainer 18 for keeping back particles of pitch or the like which may be carried over by the beer from the barrel. The standard 3 is provided with the lantern-shaped trap 19, in order to catch any carbonic acid gas which may separate from the beer in the piping. The trap, which is provided with a glass cylinder 20, has at the top a screwed stopper 21, which is provided with passages 22, 23. When the stopper is screwed out so far, that the opening of passage 23 is exposed, the carbonic acid gas can escape entirely or partly from the trap. In this manner the separated carbonic acid gas, which is under pressure, is prevented from penetrating into the valve-casing even in slight quantities, and consequently also it cannot expand in the part where the beer is caused to lose its pressure, whereby eddies could naturally be caused, which might disturb the steady flow of the beer.

Between the standard 3 and the trap 19 and the glass 20 a washer 24 is inserted which possesses a comparatively small passage 25.

Having now described my invention what I claim as new and desire to secure by Letters Patent is:—

1. A bar tap for serving out beer or the like in two stages, namely firstly frothless and then in form of froth, comprising a valve-casing, a valve-seat, connected to said casing, a hollow valve having narrow channels between itself and the casing-wall, means for lifting said valve from its seat, the hollow chamber of said valve having a valve-seat and being connected with the valve-casing by a conical nozzle the enlarged part of which is at the bottom, a second valve within said hollow valve forming the closure for the beer converted into froth, and means for lifting said second valve from its seat.

2. A bar tap for serving out beer or the like in two stages, namely firstly frothless and then in form of froth, comprising a valve-casing, a valve-seat, connected to said casing, a hollow valve extending upwardly above its valve-seat and having narrow channels between itself and the casing-wall, means for lifting said valve from its seat, the hollow chamber of said valve having a valve-seat and being connected with the valve-casing by a conical nozzle the enlarged part of which is at the bottom, a second valve within said hollow valve and below said nozzle forming the closure for the beer converted into froth, and means for lifting said second valve from its seat.

3. A bar tap for serving out beer or the like in two stages, namely, firstly frothless and then in the form of froth, comprising a valve-casing and a hollow valve, means above the seating of said valve for throttling the flow of beer for the purpose of gradually reducing the pressure of the beer, a second valve within said hollow valve, said second valve forming the closure for the beer converted into froth, the closure for the frothless beer being arranged beyond the means which cause the frothless issuing of the beer and the closure for the beer converted into froth being arranged beyond the means which cause the conversion of the beer into froth, and means for enabling the said closures to be opened by the glass itself, which has to be filled with beer, one of said means effecting the opening of the frothless beer closure, and the other effecting the opening of the closure for the beer converted into froth.

In testimony whereof I have signed my name to this specification in the presence of two subscribing witnesses.

LOUIS HESS.

Witnesses:
 ELSA HESS,
 HELENE PALM.